(12) United States Patent
Kouchi et al.

(10) Patent No.: US 9,242,625 B2
(45) Date of Patent: Jan. 26, 2016

(54) ROAD FRICTION COEFFICIENT ESTIMATING UNIT AND ROAD FRICTION COEFFICIENT ESTIMATING METHOD

(71) Applicant: JTEKT CORPORATION, Osaka-shi, Osaka (JP)

(72) Inventors: Tatsuma Kouchi, Kashiwara (JP); Yuji Kariatsumari, Yamatotakada (JP)

(73) Assignee: JTEKT CORPORATION, Osaka (JP)

( * ) Notice: Subject to any disclaimer, the term of this patent is extended or adjusted under 35 U.S.C. 154(b) by 317 days.

(21) Appl. No.: 13/622,605

(22) Filed: Sep. 19, 2012

(65) Prior Publication Data
US 2013/0074576 A1    Mar. 28, 2013

(30) Foreign Application Priority Data

Sep. 26, 2011  (JP) ................................. 2011-209295

(51) Int. Cl.
*B60T 8/172* (2006.01)

(52) U.S. Cl.
CPC ............ *B60T 8/172* (2013.01); *B60T 2210/12* (2013.01); *B60T 2210/124* (2013.01); *B60T 2230/02* (2013.01)

(58) Field of Classification Search
None
See application file for complete search history.

(56) References Cited

U.S. PATENT DOCUMENTS

| 4,951,198 A | 8/1990 | Watanabe et al. |
| 2010/0131146 A1 | 5/2010 | Nardi et al. |
| 2011/0106458 A1* | 5/2011 | Shiozawa et al. ............... 702/41 |

FOREIGN PATENT DOCUMENTS

| DE | 10 2009 022 592 A1 | 12/2010 |
| EP | 0 312 096 A2 | 10/1988 |
| EP | 2 292 490 A1 | 3/2011 |
| JP | A-2006-56388 | 3/2006 |
| JP | A-2008-126985 | 6/2008 |

OTHER PUBLICATIONS

Extended European Search Report issued in European Application No. 12 185 347.7 dated Jan. 15, 2013.

* cited by examiner

*Primary Examiner* — John Fitzgerald
*Assistant Examiner* — Herbert K Roberts
(74) *Attorney, Agent, or Firm* — Oliff PLC

(57) ABSTRACT

A road friction coefficient estimating unit calculates a tire sideslip angle and a cornering force, and estimates a road friction coefficient on the basis of the ratio of the calculated cornering force to the calculated tire sideslip angle. A vehicle travels on multiple road surfaces that differ in road friction coefficient, and tire sideslip angles and cornering forces on the road surfaces are detected in advance. The road friction coefficient estimating unit stores, in a memory, a correlation among the detected tire sideslip angles, the detected cornering forces, and the road friction coefficients in the form of numerical values or a mathematical expression, and estimates a road friction coefficient using the correlation stored in the memory.

2 Claims, 3 Drawing Sheets

ROAD FRICTION COEFFICIENT ESTIMATING UNIT AND ROAD FRICTION COEFFICIENT ESTIMATING METHOD

INCORPORATION BY REFERENCE/RELATED APPLICATION

This application claims priority to Japanese Patent Application No. 2011-209295 filed on Sep. 26, 2011 the disclosure of which, including the specification, drawings and abstract, is incorporated herein by reference in its entirety.

BACKGROUND OF THE INVENTION

1. Field of the Invention

The invention relates to a road friction coefficient estimating unit for a vehicle and a road friction coefficient estimating method for a vehicle.

2. Discussion of Background

Various road friction coefficient estimating methods are described in, for example, Japanese Patent Application Publication No. 2006-56388 (JP 2006-56388 A).

A steering assist electric motor used in a vehicle electric power steering system is provided, for example, in a steering gear device formed of a rack and a pinion or in a column mechanism arranged between a steering wheel and a steering gear device. In each case, an operation of a steered shaft coupled to steered wheels is assisted by the electric motor.

As the amount by which a tire is steered with respect to the travelling direction of a vehicle is increased by turning the steering wheel by a larger amount, a reaction force from the road surface increases and a larger force is required to turn the steering wheel. Therefore, the above-described electric motor is configured such that, as a steering torque of the steering wheel increases, a steering assist torque for assisting a steering operation is increased by increasing a motor current.

Among forces that the vehicle receives from a ground surface via each tire, a force with which the ground surface pulls the tire in the lateral direction (direction perpendicular to the travelling direction of the vehicle) is called "cornering force", and a force with which the ground surface pulls the tire in a direction perpendicular to the direction of the tire is called "tire lateral force". In addition, a torque around a ground contact point of the tire is called "self-aligning torque". That is, the tire that has a tire sideslip angle (angle between the travelling direction of the vehicle and the direction of the tire) and that is generating a cornering force (or lateral force) generates a moment (self-aligning torque) for returning the tire sideslip angle to zero degrees. The self-aligning torque is expressed by the product of a cornering force by a trail length (distance from a ground contact center to a point of application of the cornering force). Here, the trail length is expressed by the sum of a pneumatic trail and a caster trail.

In addition, the ratio of a cornering force to a tire sideslip angle is called "cornering power". When a tire sideslip angle is zero or falls within a small range close to zero, a cornering force and a tire sideslip angle are in a linear proportional relationship, and the "cornering power" takes a constant value. However, as the tire sideslip angle becomes large, the rate of increase in cornering force gradually decreases. A range in which the rate of increase in concerning force gradually decreases is called a saturated range. In the saturated range, the ratio of the cornering force to the tire sideslip angle is a function of a road friction coefficient.

A steering mechanism of the power steering system includes a pinion shaft coupled to a steering column, and a rack shaft that is meshed with the pinion shaft and that serves as a steered shaft extending in the lateral direction of the vehicle. Knuckle arms are respectively coupled to a pair of end portions of the rack shaft via tie rods, and the direction of steered wheels including tires is changed by the knuckle arms.

A value obtained by multiplying a rack axial force in the lateral direction, which acts on the rack shaft, by a knuckle arm length is equal to the self-aligning torque of a steered tire. The self-aligning torque is expressed by the product of a cornering force by a trail length, as described above. Thus, the rack axial force is obtained by multiplying a cornering force by the ratio of the trail length to the knuckle arm length.

When the rack axial force is obtained through calculation with the use of a vehicle model, if the cornering force of a tire is in a saturated range, a term that includes a road friction coefficient appears in a rack axial force estimating equation (or a cornering force estimating equation). It is possible to measure the other terms used in the rack axial force estimating equation by using various sensors mounted in the vehicle. However, it is difficult to measure a road friction coefficient.

Therefore, it is possible to apply a vehicle model only in a linear range in which a road friction coefficient is not used. However, it is difficult to apply a vehicle model in a saturated range in which a road friction coefficient is used.

SUMMARY OF THE INVENTION

The invention provides a road friction coefficient estimating unit and a road friction coefficient estimating method that are used to estimate a road friction coefficient by utilizing the fact that the ratio of a cornering force to a tire sideslip angle is a function of a road friction coefficient.

According to a feature of an example of the invention, a vehicle travels on multiple road surfaces that differ in road friction coefficient and tire sideslip angles and cornering forces on the road surfaces are detected in advance, and a road friction coefficient estimating unit stores, in a memory, a correlation among the detected tire sideslip angles, the detected cornering forces, and the road friction coefficients in the form of numerical values or a mathematical expression. Therefore, even when the vehicle is travelling on a road of which the road friction coefficient is unknown, it is possible to estimate the road friction coefficient just by calculating a sideslip angle and a cornering force.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
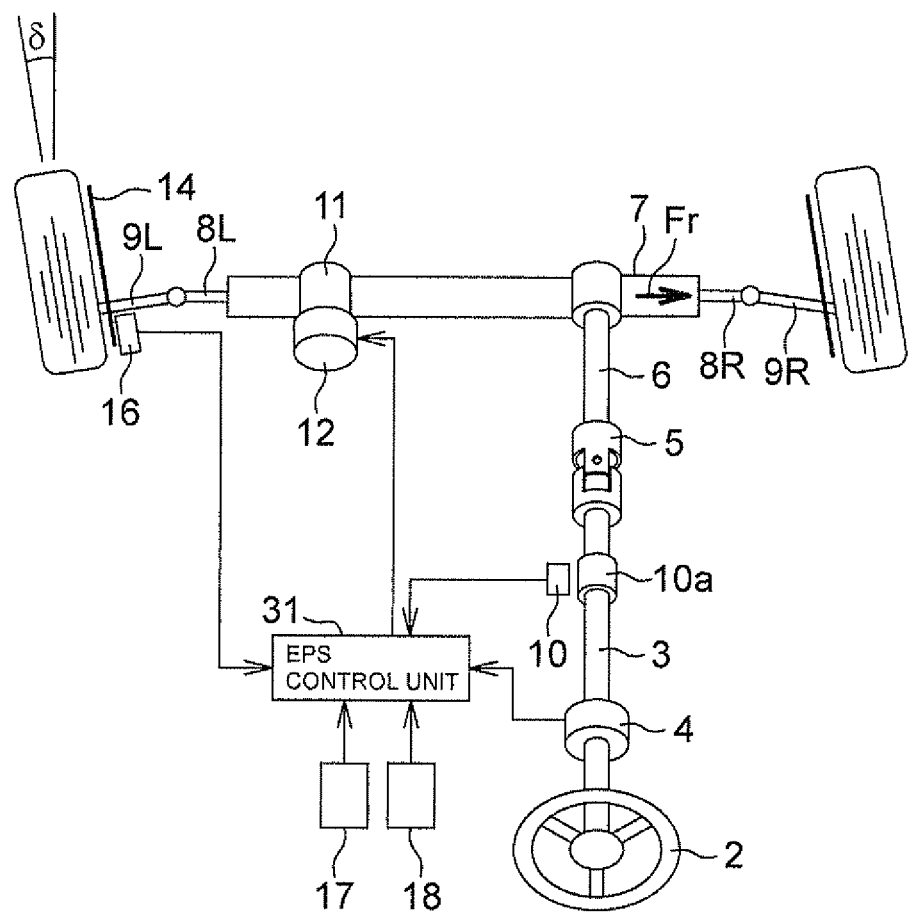
FIG. 1 is a schematic view that shows the schematic configuration of an electric power steering system to which a road friction coefficient estimating unit according to an embodiment of the invention is applied.

FIG. 1 is a schematic view that shows the schematic configuration of an electric power steering system to which a road friction coefficient estimating unit according to an embodiment of the invention is applied. The electric power steering system includes a steering member 2 such as a steering wheel, and a steering shaft 3 that is coupled to the steering member 2 so as to be rotatable together with the steering member 2. The steering shaft 3 is provided with a steering angle sensor 4 and a torque sensor 10. The steering angle sensor 4 detects a steering angle of the steering member 2. The torque sensor 10 detects a steering torque based on the rotation of the steering member 2. The steering angle sensor 4 detects a rotation angle of the steering shaft 3 by, for example, detecting magnetism from a magnet, which is installed on the circumference of the steering shaft 3, with the use of a Hall sensor. The torque sensor 10 detects a steering torque based on twisting of a torsion bar 10a caused by the steering member 2. The distal end of the steering shaft 3 is coupled to a universal joint 5, and is coupled to front tires (in the present embodiment, front wheels are steered wheels) via a steering mechanism.

The steering mechanism includes a pinion shaft 6, a rack shaft 7, and knuckle arms 9R, 9L. The rack shaft 7 is in mesh with a pinion provided at the distal end of the pinion shaft 6, and serves as a steered shaft that extends in the lateral direction of a vehicle. The knuckle arms 9R, 9L are respectively coupled to a pair of end portions of the rack shaft 7 via tie rods 8R, 8L. Thus, the rotation of the pinion is converted into an axial motion of the rack shaft 7, and the knuckle arms 9R, 9L are moved via the respective tie rods 8R, 8L. In this way, the direction of the front tires coupled to the respective knuckle arms 9R, 9L is changed.

A steering assist electric motor 12 is coupled to the rack shaft 7 via a gear device 11. The steering assist electric motor 12 is controlled according to, for example, a signal indicating the torque detected by the torque sensor 10, and generates a steering assist force. Note that the steering assist electric motor 12 may be arranged so as to be coupled to the steering shaft 3 or so as to be coaxial with the steering shaft 3.

A wheel speed sensor 16 is attached to a rotor 14 of a front wheel or a rear wheel. The wheel speed sensor 16 detects a rotation speed of the wheel. The wheel speed sensor 16 optically reads the rotation speed of the rotor 14 of the wheel, and detects a vehicle speed Vx based on the read rotation speed and the effective rotation radius of the tire.

Furthermore, the electric power steering system includes a yaw rate sensor 17 and a lateral acceleration sensor 18 that are attached to a vehicle body. The yaw rate sensor 17 detects a rotation angular velocity (yaw rate) of the vehicle. The yaw rate sensor 17 detects Coriolis force applied to a vibrating body with the use of, for example, a piezoelectric element. In this way, the yaw rate sensor 17 detects a rotation angular velocity of the vehicle. The lateral acceleration sensor 18 detects a lateral acceleration of the vehicle. The lateral acceleration sensor 18 detects a change in capacitance generated between a movable portion and a fixed portion of a sensor element to detect a lateral acceleration of the vehicle. In addition, it is also possible to detect a lateral vehicle speed Vy with the use of an integrating unit incorporated in the lateral acceleration sensor 18 or an external computing unit on the basis of the lateral acceleration detected by the lateral acceleration sensor 18.

An EPS control unit 31 executes drive control over the steering assist electric motor 12. Detection signals from the above-described steering angle sensor 4, torque sensor 10, wheel speed sensor 16, yaw rate sensor 17 and lateral acceleration sensor 18 are input into the EPS control unit 31. The EPS control unit 31 appropriately assists a steering operation based on a steering condition and a vehicle speed by driving the steering assist electric motor 12 on the basis of the steering torque detected by the torque sensor 10 and the vehicle speed detected by the wheel speed sensor 16. That is, the torque of the steering assist electric motor 12 is converted to an axial force of the rack shaft 7 via the gear device 11, and the axial force moves the knuckle arms 9R, 9L. In this way, an operating for steering the front tires coupled to the knuckle arms 9R, 9L is assisted.

Figure 2:
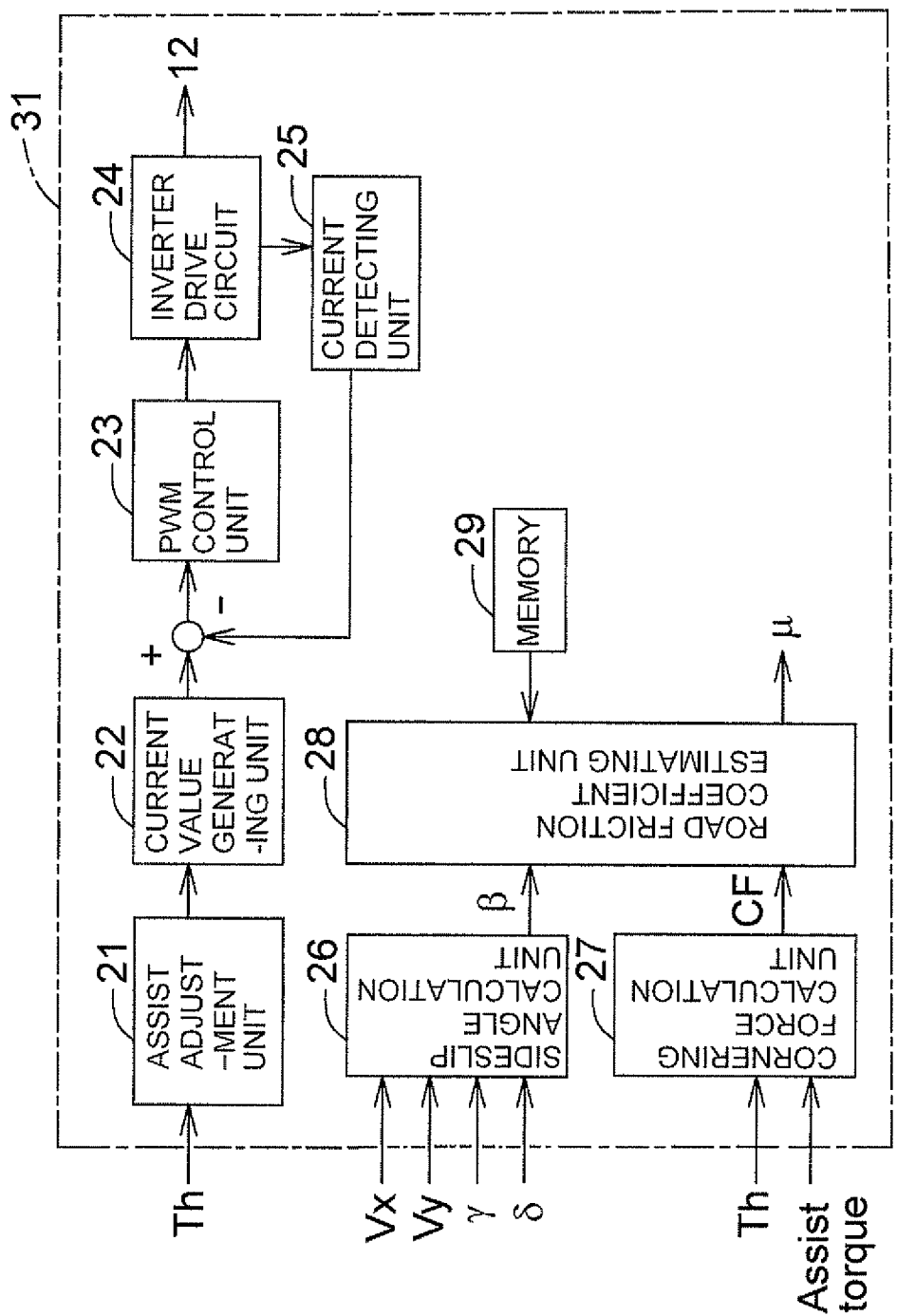
FIG. 2 is a functional block diagram of an EPS control unit.

The EPS control unit 31 has a device configuration for implementing a road friction coefficient estimating method according to the invention. The configuration of the EPS control unit 31 will be described with reference to FIG. 2. Portions of the EPS control unit 31, other than a pulse width modulation (PWM) control unit 23 and an inverter drive circuit 24, are formed of a microcomputer that includes a CPU and memories (e.g. a ROM, a RAM). The microcomputer executes predetermined programs to function as a plurality of functional processing units.

The functional processing units include an assist adjustment unit 21, a current value generating unit 22, a current detecting unit 25, a sideslip angle calculation unit 26, a cornering force calculation unit 27, and a road friction coefficient estimating unit 28. The assist adjustment unit 21 computes an assist amount corresponding to the steering torque signal indicating the steering torque detected by the torque sensor 10, and provides the assist amount to the current value generating unit 22. The current value generating unit 22 generates a current command value I* in accordance with the assist amount, and provides the current command value I* to the PWM control unit 23.

The current detecting unit 25 detects a current that flows from the inverter drive circuit 24 to the steering assist electric motor 12. The detected current is provided to the PWM control unit 23. The PWM control unit 23 computes a difference between the detected current and the current command value I*, carries out pulse width modulation on the basis of the difference, and drives the steering assist electric motor 12 via the inverter drive circuit 24.

The sideslip angle calculation unit 26 receives a signal corresponding to a tire steered angle δ. The tire steered angle δ may be, for example, based on a displacement of the rack shaft 7, which is measured by, for example, a linear encoder attached to the rack shaft 7 that serves as the steered shaft. The steering angle and the tire steered angle δ are in proportional relationship, and it is possible to easily calculate the tire steered angle δ from the steering angle. Therefore, the tire steered angle δ may be calculated on the basis of the steering angle signal indicating the steering angle detected by the steering angle sensor 4 attached to the steering shaft 3.

The sideslip angle calculation unit 26 further receives a signal that indicates a yaw rate γ, which is detected by the yaw rate sensor 17, a signal indicating a vehicle speed Vx, which is detected by the wheel speed sensor 16, and a signal indicating a lateral vehicle speed Vy, which is detected and processed by the lateral acceleration sensor 18. The cornering force calculation unit 27 receives a steering torque signal that indicates the steering torque detected by the torque sensor 10 and an assist torque signal for the power steering.

Hereinafter, βv denotes a vehicle body sideslip angle, Lf denotes a distance (constant) between the center of gravity of the vehicle and a front axle, γ denotes a yaw rate, δ denotes a tire steered angle, Vx denotes a vehicle speed, and Vy denotes a lateral vehicle speed. The sideslip angle calculation unit 26 calculates a front tire sideslip angle β according to Equations indicated below.

$$\beta v = \tan^{-1}(Vx/Vy) \quad \text{Equation 1}$$

$$\beta = \beta v + (Lf\gamma/Vx) - \delta \quad \text{Equation 1}$$

Equation 1 is used to calculate the vehicle body sideslip angle βv, and Equation 2 is used to calculate the tire sideslip angle β based on the vehicle body sideslip angle βv, the yaw rate γ and the tire steered angle δ.

The cornering force calculation unit 27 calculates a cornering force CF using the sum of the steering torque Th detected by the torque sensor 10 and the assist torque indicated by the assist torque signal for the power steering. Here, r denotes an overall gear ratio (obtained by dividing a steering wheel steering angle variation range by a tire steered angle variation range; constant), D denotes a knuckle arm length (constant), and ξ denotes a trail length (constant) (expressed by the sum of a pneumatic trail and a caster trail).

The equilibrium equation of torque around a kingpin is expressed by Equation 3.

$$CF = (r/2)Th(D/\xi) \quad \text{Equation 3}$$

The reason why (1/2) is used is because forces of two tire wheels act on the steering wheel but a cornering force CF of one wheel is calculated in Equation 3.

Computation processes in Equations 1, 2 by the sideslip angle calculation unit 26 and a computation process in Equation 3 by the cornering force calculation unit 27 are executed at computation process cycles while the vehicle is travelling. Thus, it is possible to calculate a difference Δβ between the tire sideslip angle β calculated in the current computation process cycle and the tire sideslip angle β processed in the immediately preceding computation process cycle, and a difference ΔCF between the cornering force CF calculated in the current computation process cycle and the cornering force CF processed in the immediately preceding computation process cycle, in each computation process cycle.

The difference Δβ in tire sideslip angle and the difference ΔCF in cornering force CF each are input into the road friction coefficient estimating unit 28, and the ratio ΔCF/Δβ is calculated in the road friction coefficient estimating unit 28.

Figure 3:
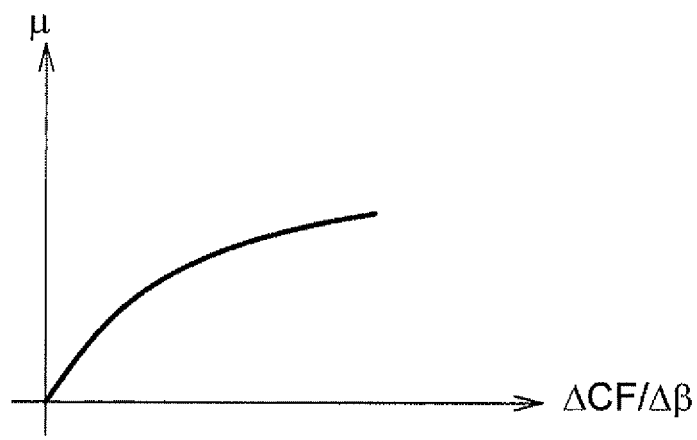
FIG. 3 is a graph that shows the correlation between a road friction coefficient $\mu$ and a ratio $\Delta CF/\Delta\beta$ (the ratio of a difference in cornering force to a difference in tire sideslip angle)

FIG. 3 is a graph that shows the correlation between a road friction coefficient μ and the ratio ΔCF/Δβ. The road friction coefficient estimating unit 28 receives the ratio ΔCF/Δβ and calculates the road friction coefficient μ of a road on which the vehicle is travelling with the use of the graph.

Figure 4:
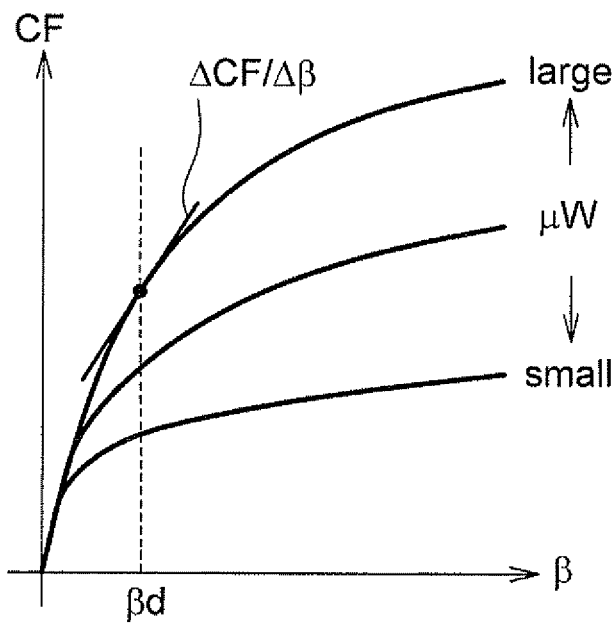
FIG. 4 is a graph that shows the correlation between a cornering force CF and a tire sideslip angle $\beta$.

FIG. 4 is a graph that shows the correlation between the cornering force CF and the tire sideslip angle β. As shown in FIG. 4, the correlation between the cornering force CF and the tire sideslip angle β is in a linear proportional relationship (the slope, that is, the ratio of the cornering force CF to the tire sideslip angle β near a tire sideslip angle of 0 degrees is called a cornering power) when the tire sideslip angle β is relatively small (referred to as a linear range). However, when the tire sideslip angle β becomes a large value, the rate of increase in cornering force CF decreases. That is, as the tire sideslip angle β increases, the ratio ΔCF/Δβ becomes smaller. A range of the tire sideslip angle β in which the ratio ΔCF/Δβ is extremely small is referred to as "saturated range". The behavior of the ratio ΔCF/Δβ varies depending on a product μW of a road friction coefficient by a tire vertical load W. Even at the same tire sideslip angle β, the ratio ΔCF/Δβ is small when the product μW is small; whereas the ratio ΔCF/Δβ is large when the product μW is large.

As shown in FIG. 4, the value of the tire sideslip angle β at the boundary between the linear range and the saturated range is fixed. This value β is denoted by "βd". The ratio ΔCF/Δβ at the fixed value βd is a function of the product μW. When the product μW is small, the ratio ΔCF/Δβ is small whereas, when the product μW becomes large, the ratio ΔCF/Δβ also increases. Thus, when the tire vertical load W is known, it is possible to draw a graph that shows the correlation between the road friction coefficient μ and the ratio ΔCF/Δβ. FIG. 3 is this graph that shows the correlation between the road friction coefficient μ and the ratio ΔCF/Δβ.

A driving test in which the vehicle travels on multiple road surfaces that differ in road friction coefficient is performed, and the tire sideslip angles β and the cornering forces CF on these roads are detected in advance. Then, the road friction coefficient estimating unit 28 stores, in a memory 29, the ratios ΔCF/Δβ in the form of numerical values or mathematical expressions in association with the tire sideslip angles βd at the time of detection.

Note that the fixed tire sideslip angle βd is preferably set to the tire sideslip angle when the cornering force is at the boundary between the linear range and the saturated range. When the tire sideslip angle βd is in the saturated range, the ratio ΔCF/Δβ is small, so there may be a significant error in estimating a road friction coefficient. When the tire sideslip angle βd is in the linear range, the ratio ΔCF/Δβ is large. However, the value of the cornering force CF itself is small, so the influence of a detection error in the cornering force CF is significant. Therefore, the tire sideslip angle at the time when the cornering force CF is at the boundary between the linear range and the saturated range is fixed as the reference value βd.

While the vehicle is travelling, the road friction coefficient estimating unit 28 applies the ratio ΔCF/Δβ calculated when the tire sideslip angle is the fixed value βd, to a table that shows the correlation between the ratio ΔCF/Δβ and the road friction coefficient μ, which is stored in the memory 29. In this way, the road friction coefficient estimating unit 28 calculates the road friction coefficient μ.

The thus calculated road friction coefficient μ is the road friction coefficient μ of the road on which the vehicle is travelling in real time. Therefore, the road friction coefficient μ is usable for various purposes. For example, by applying the tire sideslip angle β calculated by the sideslip angle calculation unit 26 to Equation 4 indicated below (where K is a cornering power of each tire), it is possible to calculate the cornering force CF.

$$CF = K\beta - (1/3)(K\beta)^2/(\mu W) + (1/27)(K\beta)^3/(\mu W)^2 \quad \text{Equation 4}$$

The cornering force CF is directly calculated regardless of whether the tire sideslip angle β is in the linear range or in the saturated range.

It is possible to convert the cornering force CF calculated according to Equation 4 into a rack axial force Fr according to Equation 5 indicated below.

$$Fr = CF(\xi/D) \quad \text{Equation 5}$$

Equation 5 as well as Equation 3 described above is an equilibrium equation of torque around the kingpin. On the basis of the rack axial force Fr, it is possible to execute reaction force control for returning a reaction force from a road to the steering member 2 operated by a driver. In this case, regardless of whether the tire sideslip angle β is in the linear range or in the saturated range, the reaction force returned to the driver accurately reflects road information on a road on which the vehicle is actually travelling, because the road friction coefficient μ corresponding to each range is known and it is possible to calculate the rack axial force Fr corresponding to the road friction coefficient μ.

In the above-described embodiment of the invention, the sideslip angle calculation unit 26 estimates the tire sideslip angle β using the vehicle speed Vx, the lateral vehicle speed Vy, the distance Lf (constant) between the center of gravity of the vehicle and the front axle, the yaw rate γ and the tire steered angle δ. Alternatively, the tire sideslip angle β may be calculated using the weight m of the vehicle, a wheelbase L (L=Lf+Lr), a distance Lr between the center of gravity of the vehicle and the rear axle, a front wheel cornering power Kf, and a rear wheel cornering power Kr, according to well-known Equation 6.

$$\beta = (A/B)(Lf/L)\delta \qquad \text{Equation 6}$$

A and B are respectively expressed as follows.

$$A = 1 - (m/2L)(Lf/LrKr)Vx^2 \qquad \text{Equation 7}$$

$$B = 1 - (m/2L^2)[(LfKf - LrKr)/KfKr]Vx^2 \qquad \text{Equation 8}$$

In addition, in the above-described embodiment of the invention, the driving test in which the vehicle travels on multiple road surfaces that differ in road friction coefficient is performed, and the ratios ΔCF/Δβ are stored in the memory 29 in advance. Then, the ratio ΔCF/Δβ calculated when the vehicle actually travels is applied to the table that shows the correlation between the ratio ΔCF/Δβ and the road friction coefficient μ, which is stored in the memory 29, to calculate the road friction coefficient μ.

It is possible to generalize this technique to any types of vehicles. That is, a driving test is performed in which vehicles that differ in weight each travel on multiple road surfaces that differ in road friction coefficient. Then, the ratios ΔCF/Δβ are stored in the memory 29 for each weight in advance. Then, the ratio ΔCF/Δβ calculated when a vehicle having a weight W actually travels is applied to a table that shows the correlation between the ratio ΔCF/Δβ corresponding to the weight W and the road friction coefficient μ, stored in the memory 29, to calculate the road friction coefficient μ. In this way, regardless of the weight of a vehicle, it is possible to calculate the road friction coefficient μ for the vehicle.

According to the invention, while the vehicle is travelling, it is possible to calculate a tire sideslip angle and to calculate a road friction coefficient using the tire sideslip angle and a tire cornering force. By utilizing the estimated road friction coefficient, it is possible to implement various controls, such as reaction force control for a vehicle power steering system.

What is claimed is:

1. A road friction coefficient estimating unit, comprising:
   a sideslip angle calculation unit configured to calculate a tire sideslip angle β in each of a plurality of computation process cycles, the sideslip angle calculation unit being further configured to calculate a difference Δβ between a tire sideslip angle β calculated in a current computation process cycle and a tire sideslip angle β calculated in an immediately preceding computation process cycle;
   a cornering force calculation unit configured to calculate a cornering force CF in each of the plurality of computation process cycles, the cornering force calculation unit being further configured to calculate a difference ΔCF between a cornering force CF calculated in the current computation process cycle and a cornering force CF calculated in the immediately preceding computation process cycle; and
   a road friction coefficient calculating unit configured to calculate a road friction coefficient based on a ratio of the difference ΔCF to the difference Δβ, wherein
   the road friction coefficient calculating unit stores, in a memory, a table that shows a correlation between the ratio only at a fixed tire sideslip angle βd and the road friction coefficient, the fixed tire sideslip angle βd being a tire sideslip angle β calculated when the cornering force CF is at a boundary between a linear range and a saturated range, and
   the road friction coefficient calculating unit is further configured to calculate the road friction coefficient, while a vehicle having the road friction coefficient calculating unit is travelling, by applying the ratio to the table only when the tire sideslip angle β is the fixed tire sideslip angle βd.

2. A road friction coefficient estimating method, comprising:
   calculating a tire sideslip angle β in each of a plurality of computation process cycles, and calculating a difference Δβ between a tire sideslip angle β calculated in a current computation process cycle and a tire sideslip angle β calculated in an immediately preceding computation process cycle;
   calculating a cornering force CF in each of the plurality of computation process cycles, and calculating a difference ΔCF between a cornering force CF calculated in the current computation process cycle and a cornering force CF calculated in the immediately preceding computation process cycle;
   calculating a road friction coefficient based on a ratio of the difference ΔCF to the difference Δβ;
   storing, in a memory, a table that shows a correlation between the ratio only at a fixed tire sideslip angle βd and the road friction coefficient, the fixed tire sideslip angle βd being a tire sideslip angle β calculated when the cornering force CF is at a boundary between a linear range and a saturated range; and
   calculating a road friction coefficient, while a vehicle having the memory is travelling, by applying the ratio to the table only when the tire sideslip angle β is the fixed tire sideslip angle βd.

* * * * *